United States Patent [19]
Vogel

[11] Patent Number: 5,725,001
[45] Date of Patent: Mar. 10, 1998

[54] DISHWASHER WITH PH-CONTROLLED PROGRAM PRE-SELECTION

[75] Inventor: Jürgen Vogel, Emskirchen, Germany

[73] Assignee: AEG Hausgerate GmbH, Nuremberg, Germany

[21] Appl. No.: 725,613

[22] Filed: Oct. 3, 1996

[30] Foreign Application Priority Data

Oct. 10, 1995 [DE] Germany ............... 195 37 669.2

[51] Int. Cl.⁶ .................................................. B08B 13/00
[52] U.S. Cl. ........................................ 134/57 D; 134/113
[58] Field of Search ............................... 134/57 D, 58 D, 134/56 D, 113, 18, 25.2, 56 R, 57 R, 58 R; 68/12.02, 12.27, 17 R

[56] References Cited

U.S. PATENT DOCUMENTS

| | | | |
|---|---|---|---|
| 3,896,827 | 7/1975 | Robinson | 134/56 D |
| 4,334,881 | 6/1982 | Reinert et al. | 134/56 D |
| 4,592,785 | 6/1986 | Reinert et al. | 134/57 D |
| 4,796,042 | 1/1989 | Mappin et al. | 134/113 |
| 5,017,852 | 5/1991 | Nagata et al. | 134/57 D |
| 5,462,606 | 10/1995 | Burns | 134/57 D |
| 5,500,050 | 3/1996 | Chan et al. | 134/56 D |
| 5,560,060 | 10/1996 | Dausch et al. | 134/57 D |
| 5,611,867 | 3/1997 | Cooper et al. | 134/57 D |

FOREIGN PATENT DOCUMENTS 9316754.7  2/1994  Germany .

Primary Examiner—Amy B. Vanatta
Attorney, Agent, or Firm—Pearne, Gordon, McCoy & Granger LLP

[57] ABSTRACT

A dishwasher is provided with a probe for measuring pH the value of a wash liquid. A corresponding wash program is run that is dependent on the pH value of the wash liquid measured by the probe. The wash program is selected from several programs stored in the program controls. The pH can be controlled by adding detergent as necessary. Extra functions can be selected by an operator.

7 Claims, 1 Drawing Sheet

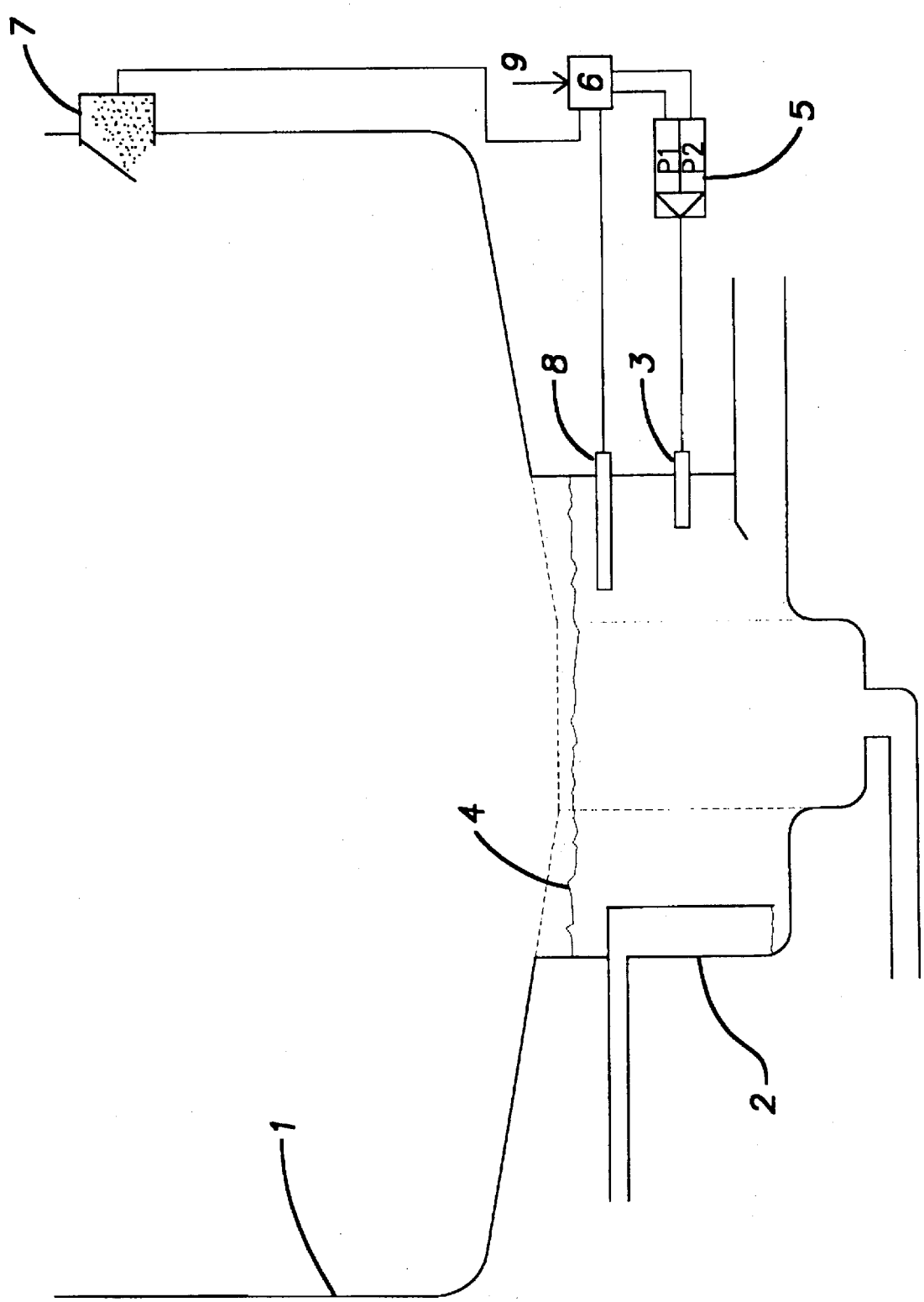

DISHWASHER WITH PH-CONTROLLED PROGRAM PRE-SELECTION

BACKGROUND OF THE INVENTION

The invention concerns a dishwasher provided with a pH probe and controls for selecting a wash program based on pH measurement.

An operator of a dishwasher usually selects the wash program to be run by activating a program pre-selector on a control panel. The detergent necessary for the process is dispensed in fixed amounts when the program is running.

DE-GM 93 16 754.7 shows a dishwasher in which the detergent is added in portions until the wash liquid reaches a predetermined pH-value. For this, a pH probe is placed in the wash liquid, with which the pH value of the wash liquid is constantly monitored.

The dish detergents available are usually conventional high-alkaline cleaners (pH 11–13) and, to a lesser extent, low-alkaline cleaners containing enzymes (pH 8–11).

Conventional cleaners are especially effective at temperatures in the 55° to 70° C. range, while cleaners containing enzymes become fully effective at low temperatures (approximately 45° to 55° C.) and take somewhat longer to work.

If the operator does not know about this temperature-dependent cleaning capacity of the individual types of cleaners and selects a program that does not match the type of detergent, the results are not optimum for that cycle.

SUMMARY OF THE INVENTION

The invention provides a dishwasher that does not require the operator to select a setting based on the various types of cleaners when pre-selecting a program. This is accomplished by selecting a wash program according to the pH value of the wash liquid.

The dishwasher has electronic program controls and a probe to measure the pH of the wash liquid. Depending on the pH value found, the program set in the program control runs, and the operator is largely freed from having to select the program. Only in exceptional cases does the operator influence the program by selecting a certain function. This therefore prevents the wrong setting from being selected because of the different types of detergents, which can be identified by measuring their pH value.

In a dishwasher with electronic program control, a dispensing device to add detergent, and a probe to measure the pH value of the wash liquid, the wash programs are predetermined in a control program. This control program is an integral part of the electronic program control and controls the dishwasher. The predefined wash programs differ primarily in the maximum temperature of the wash liquid and the length of the individual steps in the program.

Detergent is necessary to wash the dishes, and the operator puts the detergent into the dispensing device of the dishwasher before the program starts. While the program is running, the pH value of the wash liquid is constantly monitored. Based on the value measured, a wash program that corresponds to the pH value is run. In the case of a conventional, high-alkaline detergent, for example, a shorter program with a maximum temperature of 70° C. is run. On the other hand, if the pH measured is low alkaline, an enzymatic cleaner is being used. Since the enzymes have an especially good effect at temperatures under 55° C., a longer wash program with a maximum temperature of approximately 45° to 55° C. is therefore run.

In one particular version, a dispensing device is built into the dishwasher and dispenses the detergent in portions. In this case, when the pH value in the wash program that is running falls as the result of the alkaline wash liquid mixing with any acidic dirt, detergent is dispensed again until the pH again reaches the value for the program being run.

In another version, the program controls do not contain exclusively pH value-dependent fixed wash programs. Instead a basic program is run based on the pH value measured. This basic program can be influenced by the operator to a certain extent by choosing extra functions. One possible extra function is reducing the maximum temperature for sensitive dishes. Another function that can be chosen would be, for example, to move the desired pH into a higher or lower range for different degrees of dirt. For example, if the operator had a load of very dirty dishes, then the desired pH value standard would be raised compared to the basic program, which is based on a normal amount of dirt.

Besides the conditions described, where more detergent must be added one or more times as a result of a pH value that is low or falls during the wash program, in practice there is also the case that the pH value comes out too high in comparison to the desired standard. If this happens, it must be assumed that after the whole wash program, there will be residual alkalinity on the dishes. Since it cannot be completely ruled out that this may cause discomfort to especially sensitive people, this condition should definitely be avoided. In this case, an extra rinse cycle with fresh water is run by the program controls to partially neutralize any residual alkalinity that exists.

BRIEF DESCRIPTION OF THE DRAWING

The invention will be explained in greater detail below with reference to the drawing showing an example of an embodiment of the invention.

The FIGURE shows a schematic side elevation of a dishwasher according to the invention.

DETAILED DESCRIPTION OF THE PREFERRED EMBODIMENTS

The drawing shows a wash compartment 1 of a dishwasher (shown only partially) with a pH probe 3 built into a sump 2 of the compartment. This pH probe 3 determines the pH value of wash liquid 4 in the sump during the entire wash program. Electronic program controls 6 of the dishwasher operate a dispensing device to add detergent in a set, predetermined quantity to the wash liquid 4. The pH value of the wash liquid 4 is measured after a predetermined mixing time. Using the pH value measured and a table 5 stored in a program, the parameters of a corresponding wash program P1 or P2 are input to the electronic controls 6.

Program P1 represents a wash program at the maximum temperature 65° C., which is based on a highly alkaline value measured at approximately pH 11–13.

On the other hand, program P2 is a wash program with a maximum temperature of 50° C. and a longer running time compared to program P1. A low-alkaline value measured by the pH probe 3 is the basis for this program P2, which is a result of using a cleaner containing enzymes. The longer running time required is based on the longer period of time this type of cleaner takes to work.

One of the wash programs P1 or P2 is run and the temperature is controlled using a heater 8 in the wash compartment according to the program set by the electronic controls 6.

During the wash program P1 or P2, if the pH probe 3 informs the electronic controls 6 of a fall in the pH value beyond the range for that wash program P1 or P2, then the appropriate dispensing device 7 dispenses more detergent.

The dishwasher also has a switching device 9 that can be activated by controls, not shown, for an extra function. For example, when the operator selects an extra function, such as a "very dirty" function, the electronic controls 6 increase the desired pH value preset in the wash programs P1 and P2, to accomplish a correspondingly greater addition of detergent.

This higher alkaline wash liquid 4 produces better cleaning on dishes that are more dirty than normal.

The embodiments shown and described are exemplary. The invention includes modifications within the scope of the claims.

What is claimed is:

1. A dishwasher comprising a dispensing device for adding detergent, electronic program controls connected to operate the dispenser, and a probe for measuring the pH of wash liquid in the dishwasher, wherein the program controls are provided with wash programs such that an appropriate one of the wash programs is selected based on a pH value of wash liquid (4) in the dishwasher as measured by said probe.

2. A dishwasher according to claim 1, wherein the detergent is added in metered amounts such that the pH value of the wash liquid is maintained in a range that is suitable for the program selected.

3. A dishwasher according to claim 1, wherein an extra function can be selected in addition to the selected program.

4. A dishwasher according to claim 3, wherein the extra function comprises a desired pH setting dependent on the degree of dirtiness of objects being washed.

5. A dishwasher according to claim 1, wherein if an upper pH limit is exceeded, an additional cycle can be added in a last part of the selected program.

6. A dishwasher according to claim 2, wherein an extra function can be selected in addition to the selected program.

7. A dishwasher according to claim 6, wherein the extra function comprises a pH desired setting dependent on the degree of dirtiness of objects being washed.

* * * * *